United States Patent Office 3,494,925
Patented Feb. 10, 1970

3,494,925
1 - p - CHLOROPHENYL - 3 - IMINO - 2 - METHYL-
2,3,5,6,7,8 - HEXAHYDROIMIDAZO(1,5 - a)PYRI-
DINE AND INTERMEDIATES THEREFOR
Albert J. Frey, Essex Fells, and Robert E. Manning
Mountain Lakes, N.J., assignors to Sandoz Inc.,
Hanover, N.J.
No Drawing. Filed Oct. 5, 1967, Ser. No. 673,003
Int. Cl. C07d 29/00
U.S. Cl. 260—293                    3 Claims

ABSTRACT OF THE DISCLOSURE

This disclosure pertains to a novel imidazopyridine, namely, 1 - p-chlorophenyl-3-imino-2-methyl-2,3,5,6,7,8-hexahydroimidazo[1,5-a]pyridine. This compound is useful as a hypotensive.

---

This invention relates to a novel imidazo pyridine and more particularly to a 2-methyl imidazo [1,5-a]pyridine. Still more particularly, this invention concerns 1-p-chlorophenyl - 3 - imino-2-methylhexahydroimidazo[1,5-a]pyridine, intermediates therefor, and their methods of preparation.

The novel compound of this invention may be represented by the formula

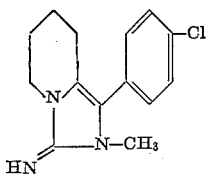

(I)

This imidazo pyridine of Formula I above is prepared by treating a 1-hydroxy-2-methyl-3-thioxo-imidazo[1,5-a] pyridine with a lower alkyl halide such as methyl iodide, ethyl iodide, methyl bromide, and the like, to obtain an intermediate 2-methyl-3-lower alkythio imidazo[1,5-a] pyridine salt, and treating said intermediate with ammonia to obtain the product 3-imino-substituted imidazopyridine of Formula I. The process for preparing compound (I) may be illustrated by the following flow diagram:

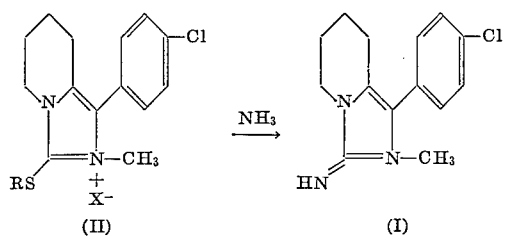

where R is lower alkyl and X is halo having an atomic weight of about 80–127, i.e., iodo or bromo.

In accordance with the above process, the 3-loweralkylthioimidazopyridine salt (II), e.g., the iodo salt, is treated with ammonia at elevated temperature and pressure. Temperatures of about 50 to about 120° C., preferably 80 to 100° C. are utilized whereas pressures of about 760 to about 10,000 mm. Hg are preferred. Solvents such as lower alkanols may be used but are not considered necessary, and excess ammonia may also be utilized.

Neither the particular temperature nor pressure used are critical to the successful completion of the reaction. The product (I), is recovered by conventional techniques such as evaporation and crystallization.

The salt (II) is preparable according to the following reaction:

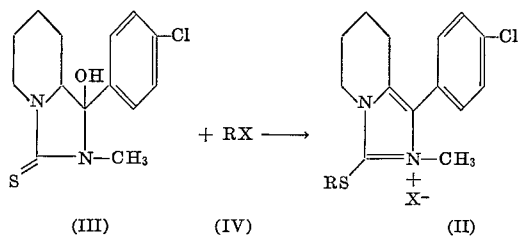

where R and X are as defined above.

The 1-hydroxy-3-thioxo-imidazo pyridine (III) is converted to the salt (II) by treatment with a lower alkyl iodide or bromide in solvent such as a lower alkanol, i.e., methanol, isopropanol, and the like, tetrahydrofuran, acetone and like solvents at a temperature of from about room temperature to about reflux temperature. Although neither the solvent nor temperature used are critical, preferred temperatures of reaction are about 25° to about 100° C., and more preferably about 50° to about 70° C. The salt (II) may then be recovered by conventional recovery techniques.

The starting compound of this invention and in particular the 1 - hydroxy - 2-methyl-3-thioxoimidazo[1,5-a]pyridine of Formula III above is prepared by treating p-chlorophenyl-2-piperidyl ketone with methyl isothiocyanate in solvent such as benzene.

The 2-methyl-3-imino-imidazopyridine of Formula I is useful because it possesses pharmacological properties in animals. In particular, this compound can be used as an anti-hypertensive agent, as indicated by its activity in dogs tested by blood pressure measurement using a mercury manometer or transducer via a catheter inserted in either the carotid or femoral artery. When so utilized, this active agent of Formula I may be combined with one or more pharmaceutically acceptable carriers or adjuvants. It may be administered orally or parenterally and, depending upon the mode of administration, the dosage to be utilized will vary. Furthermore, this compound may be similarly administered in the form of its non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like. In general, satisfactory results are obtained when this imidazo pyridine is administered in a daily dosage of about 5 mg. to about 25 mg. per kg. of animal body weight. This daily dosage is preferably administered 2 to 4 times a day, or in sustained release form. For most large mammals, the daily dosage is from about 10 mg. to about 50 mg. Dosage forms suitable for internal use comprise from about 2.5 mg. to about 25 mg. of the active compound in intimate admixture with a solid or liquid pharmaceutically acceptable carrier or diluent.

A representative formulation suitable for oral administration is a tablet prepared by standard tabletting techniques which contains the following:

| Ingredient: | Parts by weight |
|---|---|
| 1-p-chlorophenyl-3-imino-2-methyl - 2,3,5,6,7,8-hexahydroimidazo[1,5,-a]pyridine | 30 |
| Tragacanth | 2 |
| Lactose | 59.5 |
| Corn starch | 5 |
| Talcum | 3 |
| Magnesium stearate | 0.5 |

The following examples are provided for the purpose of illustration and not by way of limitation.

EXAMPLE 1

Step 1.—1-p-chlorophenyl-2-methyl-3-methylthio-5,6,7,8-tetrahydroimidazo[1,5-a]pyridinium iodide

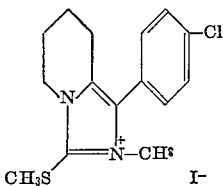

A solution of 1-p-chloropheynl-1-hydroxy-2-methyl-3-thioxo - 1,2,3,5,6,7,8,8a-octahydro-imidazo[1,5,-a]pyridine (200 mg.) and methyl iodide (0.2 ml.) in methanol (5 ml.) is refluxed one hour and evaporated in vacuo. The residue is crystallized from acetone to give 100 mg. of 1 - p-chlorophenyl-2-methyl-3-methylthio-5,6,7,8,-tetrahydroimidazo[1,5,-a]pyridinium iodide.

Step 2.—1-p-chlorophenyl-3-imino-2-methyl - 2,3,5,6,7,8-hexahydroimidazo[1,5-a]pyridine

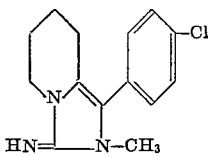

A mixture of 7 g. 1-p-chlorophenyl-2-methyl-3-methylthio-5,6,7,8-tetrahydroimidazo[1,5 - a]pyridinium iodide and liquid ammonia (200 ml.) is heated 16 hours at 50° in a steel bomb. The bomb is cooled to room temperature and the ammonia is allowed to evaporate. The residue is crystallized from methanol-water (1:3) to give 1.4 g. of crude product which is then recrystallized from methanol-water (1:3) to afford 1.1 g. of substantially pure 1-p-chlorophenyl-3-imino-2-methyl-2,3,5,6,7,8 - hexahydroimidazo[1,5-a]pyridine; M.P. 153–155°. When 7 g. of 1 - p-chlorophenyl-2-methyl-3-methylthio-5,6,7,8-tetrahydroimidazo[1,5-a]pyridinium bromide is used in place of the iodide salt above, the product 3-imino imidazopyridine is again obtained.

EXAMPLE 2

1-p-chlorophenyl-1-hydroxy-2-methyl-3-thioxo-1,2,3,5,6,7,8,8a,-octahydroimidazo[1,5-a]pyridine

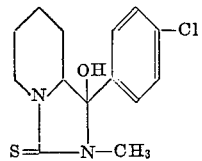

A mixture of p-chlorophenyl-2-piperidyl ketone (2.2 g.), methyl isothiocyanate (1.6 g.), and benzene (30 ml.) is stirred for 3 hours. The resultant solid is collected by filtration to give 2.5 g. of material which is recrystallized twice from methanol to afford 1.1 g. of 1-p-chlorophenyl-1-hydroxy-2-methyl-3-thioxo-1,2,3,5,6,7,8,8a - octahydroimidiazo[1,5-a]pyridine; M.P. 180° to 182° C.

What is claimed is:
1. 1-p-chlorophenyl-3-imino-2-methyl-2,3,5,6,7,8 - hexahydro-imidazo[1,5-a]pyridine.
2. A non-toxic pharmaceutically acceptable acid addition salt of the compound of claim 1.
3. A compound of the formula

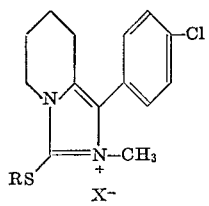

where
X represents iodo or bromo, and
R represents loweralkyl.

References Cited

UNITED STATES PATENTS

| 1,915,334 | 6/1933 | Salzberg et al. | 260—243 |
| 2,075,359 | 3/1937 | Salzberg et al. | 167—22 |

OTHER REFERENCES

Burger: Medicinal Chemistry, vol. 1, 1951, pp. 38, 39, 44, 45, and 48.

HENRY R. JILES, Primary Examiner

S. D. WINTERS, Assistant Examiner

U.S. Cl. X.R.

260—293.4; 424—267